(12) United States Patent
Wohlfarth et al.

(10) Patent No.: US 10,086,644 B2
(45) Date of Patent: Oct. 2, 2018

(54) TRACK WIDENING SYSTEM FOR MOTOR VEHICLES

(71) Applicants: Klaus Wohlfarth, Fichtenberg (DE); Andreas Weidner, Fichtenberg (DE); Edgar Simonjan, Vellberg (DE)

(72) Inventors: Klaus Wohlfarth, Fichtenberg (DE); Andreas Weidner, Fichtenberg (DE); Edgar Simonjan, Vellberg (DE)

( * ) Notice: Subject to any disclaimer, the term of this patent is extended or adjusted under 35 U.S.C. 154(b) by 70 days.

(21) Appl. No.: 14/823,502

(22) Filed: Aug. 11, 2015

(65) Prior Publication Data

US 2016/0046146 A1    Feb. 18, 2016

(30) Foreign Application Priority Data

Aug. 12, 2014 (DE) .................. 10 2014 215 986
Jan. 19, 2015 (DE) .................. 20 2015 000 487 U

(51) Int. Cl.
  *B60B 3/14* (2006.01)
  *B60B 19/00* (2006.01)
  *B60B 3/16* (2006.01)

(52) U.S. Cl.
  CPC ............ *B60B 3/147* (2013.01); *B60B 3/16* (2013.01); *B60B 19/00* (2013.01); *B60B 2310/306* (2013.01); *B60B 2360/32* (2013.01); *B60B 2360/341* (2013.01); *B60B 2900/112* (2013.01); *B60B 2900/116* (2013.01); *B60B 2900/351* (2013.01); *B60Y 2200/10* (2013.01); *B60Y 2200/11* (2013.01)

(58) Field of Classification Search
  CPC ........... B60B 3/14; B60B 3/145; B60B 3/147; B60B 7/0013; B60B 7/06; B60B 7/065; B60B 7/08
  See application file for complete search history.

(56) References Cited

U.S. PATENT DOCUMENTS 3,649,079 A * 3/1972 English ............... B60B 3/14
                                                 301/35.627
3,998,494 A * 12/1976 Spisak ................ B60B 7/00
                                                 301/37.31

(Continued)

FOREIGN PATENT DOCUMENTS

DE  42 27 259 C1  3/1994
DE  94 02 438 U1  5/1994

(Continued)

OTHER PUBLICATIONS

Office Action received in connection with foreign priority application DE 10 2014 215 986.5, dated Dec. 22, 2014.

(Continued)

*Primary Examiner* — Jason R Bellinger
(74) *Attorney, Agent, or Firm* — Marcus N. DiBudun; John R. Aaron

(57) ABSTRACT

A track widening system for motor vehicles, having at least one track widening disc and at least one centering ring, which is inserted into a central opening of the track widening disc, wherein the centering ring has at least one catch device which is arranged at the free end of a resilient arm and wherein the track widening disc has at least one corresponding catch device. The centering ring may be plastic, and may be fiber-reinforced. One or more centering rings may have different colors.

35 Claims, 9 Drawing Sheets

(56) References Cited

U.S. PATENT DOCUMENTS

| | | | | | |
|---|---|---|---|---|---|
| 4,847,030 | A | * | 7/1989 | Stalter | B29C 33/12 249/105 |
| 5,112,112 | A | * | 5/1992 | Baba | B60B 7/08 301/108.3 |
| 5,454,628 | A | | 10/1995 | Maiworm et al. | |
| 5,601,343 | A | * | 2/1997 | Hoffken | B60B 1/06 301/111.04 |
| 2015/0224819 | A1 | | 8/2015 | Huusmann | |

FOREIGN PATENT DOCUMENTS

| | | |
|---|---|---|
| DE | 199 36 225 A1 | 10/1997 |
| DE | 297 11 384 U1 | 10/1997 |
| DE | 299 15 048 U1 | 2/2000 |
| DE | 299 21 934 U1 | 5/2000 |
| EP | EP 0 607 417 A1 | 7/1994 |
| EP | EP 0 607 417 B1 | 11/1996 |
| WO | WO 94/04379 A1 | 3/1994 |
| WO | WO 2014/048551 A1 | 4/2014 |

OTHER PUBLICATIONS

Machine translation of DE 199 36 225 A1 (retreived from EPO Dec. 10, 2015).
Machine translation of DE 94 02 438 U1 (retreived from EPO Dec. 10, 2015).
Machine translation of WO 94/04379 A1 (retreived from EPO Dec. 22, 2015).
International Search Report and Written Opinion relating to parallel application PCT/EP2015/068329, dated Oct. 14, 2015.

* cited by examiner

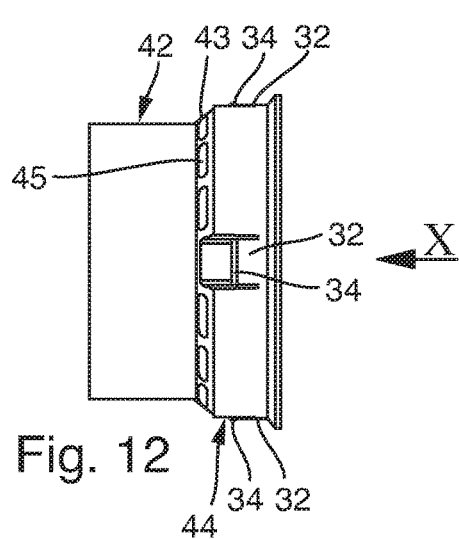
Fig. 12
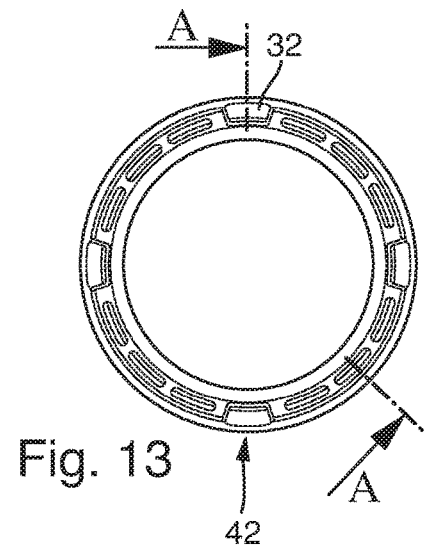

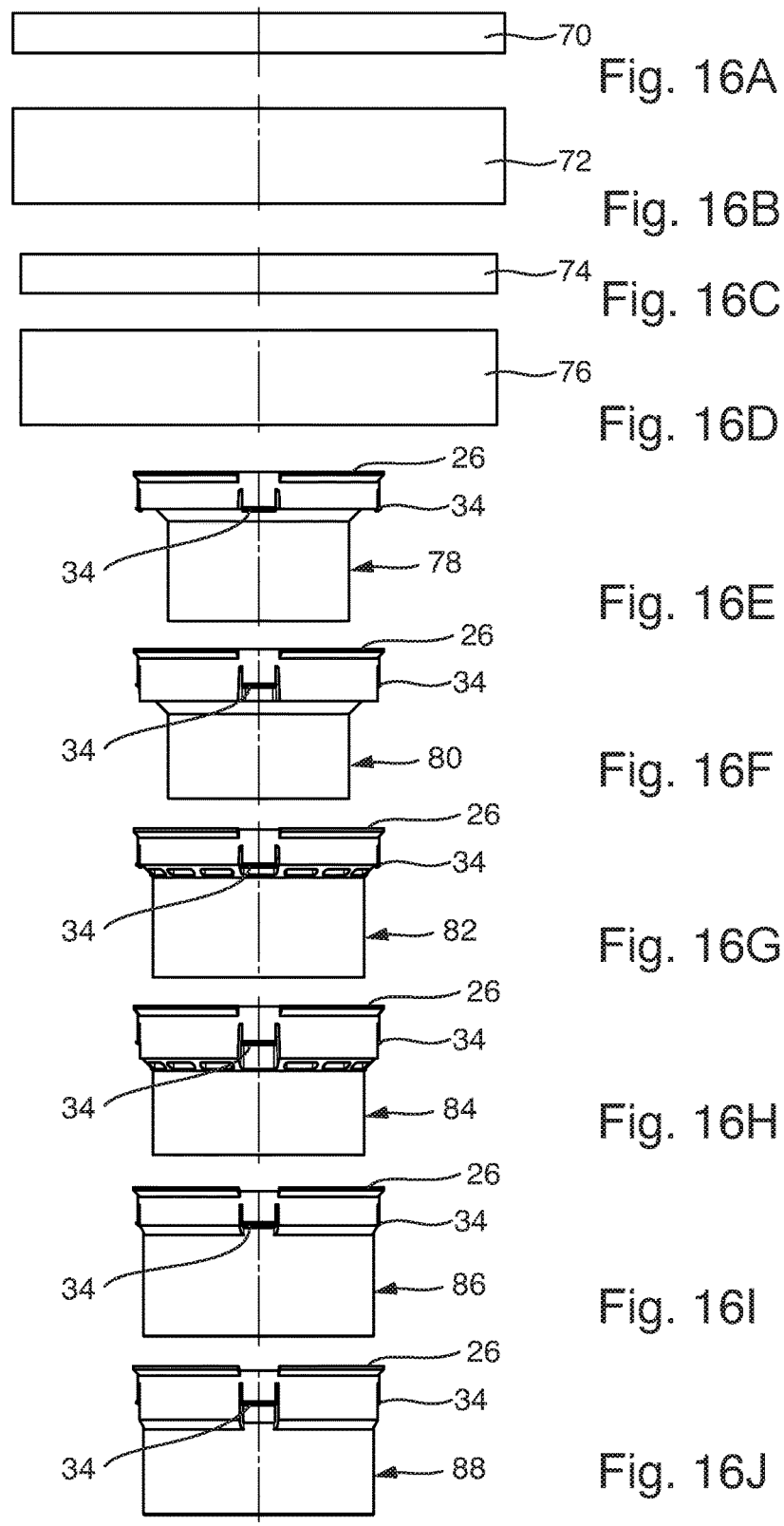

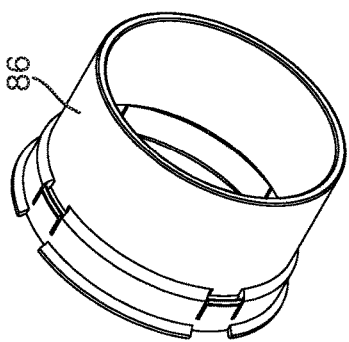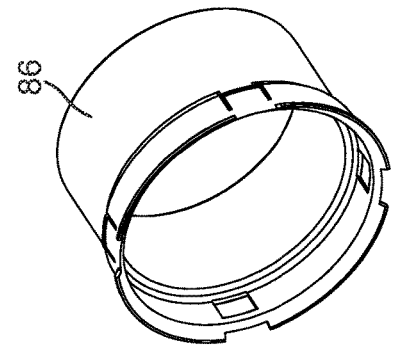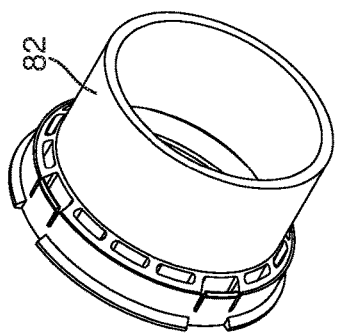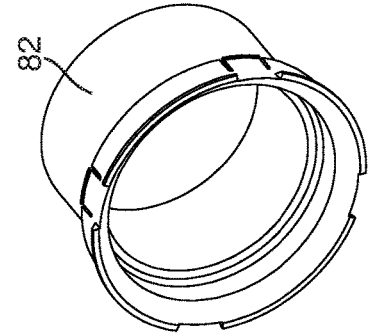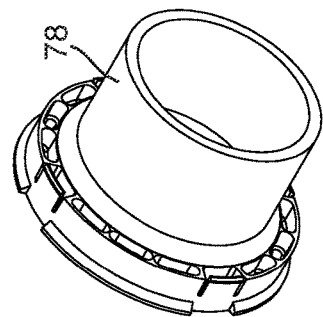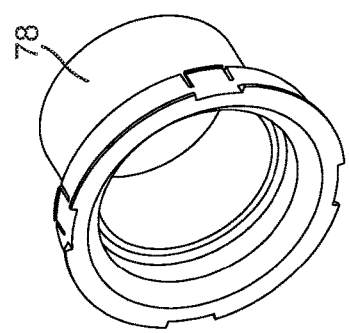

TRACK WIDENING SYSTEM FOR MOTOR VEHICLES

CROSS-REFERENCE TO RELATED APPLICATIONS

The present application claims the benefit of priority of German Application No. 10 20140215 986.5, filed Aug. 12, 2014, and of German Application No. 20 2015 000 487.3, filed Jan. 19, 2015, each of which are incorporated herein by reference in their entirety.

BACKGROUND

The invention relates to a track widening system or wheel spacer system for motor vehicles. More particularly, embodiments of the present invention pertain to systems having at least one track widening disc or wheel spacer disc and at least one centering ring for insertion into the track widening disc. There heretofore lacks a universal system enabling track widening of differing amounts and centering on wheels having different diameters.

BRIEF SUMMARY OF THE INVENTION

An object of the invention is to provide a track widening system for motor vehicles which can be used in a flexible manner for different wheels and different vehicles.

To this end, there is provided according to some embodiments of the present invention a track widening system that may include at least one track widening disc and a centering ring which is inserted into a central opening of the track widening disc. The centering ring comprises plastics material. The centering ring may have at least one first catch device which is arranged at the free end of a resilient arm and the track widening disc has a corresponding second catch device.

Because the track widening system in accordance with some embodiments of the present invention may include a track widening disc and a separate centering ring, the track widening system can be flexibly adapted to different vehicles and different wheels. This is because the track widening disc has to fit on the wheel bolts of the vehicle and the centering ring must be adapted to the diameter of a central opening in the wheel so that the wheel is orientated during positioning on the centering ring precisely concentrically relative to the track widening disc or concentrically relative to the wheel hub or the pitch circle with the wheel bolts. The invention recognizes that the centering ring is not loaded during driving operation because the forces and momentums introduced by the wheel into the wheel hub and vice versa are transmitted exclusively by means of the track widening disc. Therefore, in some embodiments, the centering ring, which only carries out its centering function when the track widening disc is mounted and when the wheel is mounted, may comprise plastic material. The centering ring can thus be produced in a very cost-effective manner and also with extremely varied dimensions in order to be able to use the track widening system according to the invention for different vehicles and wheels. The centering ring may be constructed, for example, as a plastics injection-moulded component, especially fiber-reinforced plastics, because, as mentioned, it is not subjected to any loads at all during driving operation. The production of the centering ring from plastics material, in particular from plastics injection-moulded material, also makes it easier to produce different centering rings which then ensure the adaptation of the track widening discs to different wheels.

In some embodiments of the invention, the first catch device is in the form of a catch projection which projects outwards in a radial direction. In some implementations, the catch projection may be at the free end of a resilient arm which can readily be produced on a plastics component, such as a plastics injection-moulded component. As above, the centering ring may not subjected to any loads during driving operation and consequently the catch projection at the free end of a resilient arm may only be subject to forces which occur when the track widening disc and the wheel are mounted on the wheel hub. Advantageously, a plurality of resilient arms having catch projections may be provided on the centering ring at the free ends. In some implementations four resilient arms may be provided. However it is to be appreciated that other number of arms and catch projections are contemplated in accordance with some embodiments of the invention.

In some embodiments, the second catch device may be a shoulder which extends around the central opening. In some embodiments, the second catch device may be a chamfered portion which extends around the central opening. In some embodiments, the second catch device may be a groove which extends around the central opening.

A peripheral shoulder, a peripheral chamfered portion or a peripheral groove can be provided in the track widening disc, and unitarily formed. The track widening disc may be formed of metal, and thus the shoulder, chamfered portion, or peripheral groove can be mechanically processed at the same time other features of the track widening disc. For example, and without limitation, the peripheral shoulder, the peripheral chamfered portion or the peripheral groove can therefore be formed in the track widening disc, for example, during a turning process. The outwardly projecting catch projections on the centering ring may engage in the central opening of the track widening disc when the centering ring is introduced. In the case of thick track widening discs, a groove may be provided in the inner wall of the central opening and, in the case of relatively thin track widening discs, the catch projections of the centering ring may engage at a peripheral shoulder or a peripheral chamfered portion which may be arranged at the transition between the central opening and the upper side and/or lower side of the track widening disc.

In a development of the invention, the track widening disc may have a plurality of wheel bolt holes which are provided for the introduction of wheel bolts. A dimension of the wheel bolt holes in a radial direction of the track widening disc may be from about 1.2 times to about 1.7 times. For example, and without limitation, it may be 1.5 times the diameter of the wheel bolts. In some embodiments, the track widening disc may have at least one curved slot which extends in the peripheral direction as a wheel bolt hole. In this manner, different hole configurations can be covered with a track widening disc. In this manner, the number of individual components necessary for the track widening system according to the invention in order to cover different vehicles and wheels can also be substantially reduced. Different pitch circles in different vehicles can be covered by means of such a configuration of the wheel bolt holes in the track widening disc. It is also thereby possible to substantially reduce the number of different track widening discs which are necessary for different vehicles.

In some embodiments of the invention, a plurality of centering rings may be provided in the track widening system, wherein each centering ring has a retention portion for fixing to the track widening disc with at least a first catch device and a centering portion for arrangement in a central opening of a wheel. All the centering rings may have the same outer diameter in the retention portion and the centering rings may differ from each other at least partially in terms of the outer diameter of the centering portion.

It is thereby possible to ensure that all the centering rings which are different from each other can fit in all the track widening discs of the track widening system according to the invention and can be engaged therein. As already described, the corresponding second catch devices may also be arranged at mutually different track widening discs in an identical manner so that all the centering rings of the track widening system can be engaged.

In some implementations, a plurality of track widening discs of different thicknesses may be included in the track widening system.

In some implementations, the track widening discs may have differently arranged wheel bolt holes.

Although the track widening system in accordance with some embodiments of the invention may not require different track widening discs and different centering rings in order to be able to cover different vehicles and wheels, the necessary number of individual components, particularly the number of different track widening discs, can be substantially reduced. Different track widening discs may be provided to produce different dimensions for the track widening obtained.

The above-described objects, advantages and features of the invention, together with the organization and manner of operation thereof, will become apparent from the following detailed description when taken in conjunction with the accompanying drawings, wherein like elements have like numerals throughout the several drawings described herein. In addition, individual features of different embodiments which are described and/or illustrated in the drawings may be combined with each other without exceeding the scope of the invention. Further benefits and other advantages of the present invention will become readily apparent from the detailed description of the preferred embodiments.

BRIEF DESCRIPTION OF THE DRAWINGS

FIG. 12 is a side view of a centering ring of a track widening system in accordance with some embodiments of the present invention.

FIG. 13 is another side view of the centering ring of FIG. 12.

FIG. 14 is a cross sectional view of FIG. 13 along section A-A, including two enlarged detailed illustrations.

FIG. 15 is another side view of the centering ring of FIG. 12.

FIGS. 16A-D are views of different track widening discs, and FIGS. 16E-J are views of different centering rings, each in accordance with some embodiments of the present invention, shown centrally aligned.

FIGS. 17A and 17B are oblique forward and reverse side views of a centering ring of a track widening system in accordance with some embodiments of the present invention.

FIGS. 18A and 18B are oblique forward and reverse side views of a centering ring of a track widening system in accordance with some embodiments of the present invention.

FIGS. 19A and 19B are oblique forward and reverse side views of a centering ring of a track widening system in accordance with some embodiments of the present invention.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without all of the specific details provided.

Figure 1:
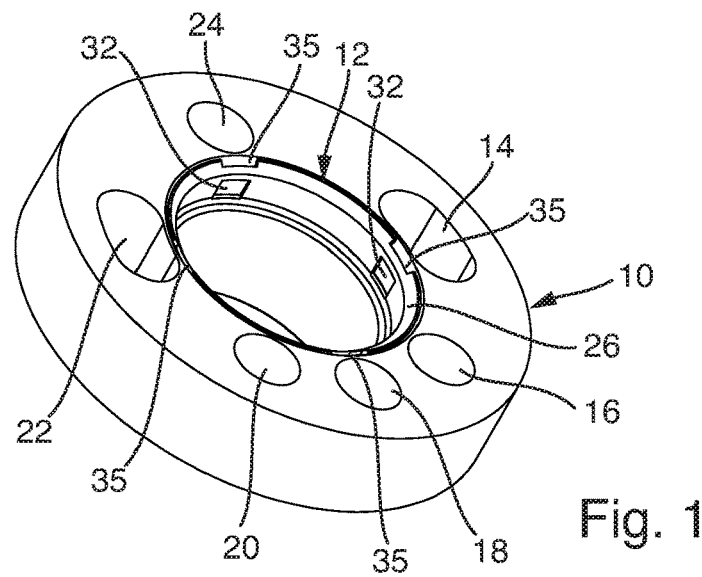
FIG. 1 is an oblique view of a track widening system including a track widening disc and a first centering ring in accordance with some embodiments of the present invention.

FIG. 1 illustrates a track widening disc 10 having a centering ring 12 of the track widening system according to the invention. The track widening disc 10 is illustrated has having a total of six wheel bolt holes 14, 16, 18, 20, 22 and 24, however it is to be appreciated that other number of holes are contemplated in accordance with some embodiments of the present invention. The wheel bolt holes 16, 18, 20 and 24 may be constructed as circular holes whereas the wheel bolt holes 14 and 22 may be constructed as slots which extend in a peripheral direction of the track widening disc 10. Usually, wheel hubs of motor vehicles are provided with four or five wheel bolts. The wheel bolt holes 14 to 24 may consequently not all be used simultaneously for the introduction of wheel bolts but are instead arranged in such a manner that different hole configurations of wheel hubs can be covered with a single track widening disc 10. The two slots 14, 22 which are curved in a rounded manner may also be used for this. Furthermore, the diameter of the circular wheel bolt holes 16, 18, 20, 24 and the dimension of the wheel bolt holes 14, 22 when viewed in a radial direction may be from about 1.2 to 1.7 times, and in some preferred embodiments 1.5 times, as large as the outer diameter of the wheel bolts used. Slightly different pitch circle diameters of wheel bolts in different vehicles can thereby be covered.

The centering ring 12, when viewed from the visible rear side of the track widening disc 10 in FIG. 1, may be inserted therein and may have a peripheral, chamfered collar 26 which defines an end position of the centering ring 12 on the track widening disc 10 in an axial direction. The abutment of the collar 26 against a corresponding chamfered portion 28 at the transition of the rear side of the track widening disc 10 into the central opening 30 thereof can be seen in the cross-section of FIG. 2, which rear side is shown at the top in FIG. 2.

The centering ring 12 may have four resilient arms 32, at the free end of which a catch projection 34 is arranged, respectively. However it is to be appreciated that other numbers of resilient arms are contemplated in accordance with some embodiments of the present invention. The illustration of FIG. 1 depicts only two resilient arms 32 and associated catch projections 34. The catch projections 34 may engage in a groove 36 which extends radially outwards from the central opening 30 of the track widening disc 10. As a result, in some examples, the centering ring 12 may be introduced into the track widening disc 10 by the centering ring 12 in FIG. 2 being pushed into the track widening disc 10 from above until the chamfered collar 26 abuts the chamfered portion 28 of the track widening disc 10 and, at the same time, the catch projections 34 engage in the peripheral groove 36. The catch projections 34 can be disengaged from the groove 36 by a tool, for example, a screwdriver, being inserted into the recesses 35 of the centering ring 12. However, the catch projections 34 may also be disengaged without tools, such as by pressing powerfully on the centering ring 12.

The centering ring 12 may have a retention portion 38 whose outer diameter is only slightly smaller than the inner diameter of the central opening 30 of the track widening disc 10. The centering ring 12 may be retained with this retention portion 38 in the central opening 30 of the track widening disc 10 and centered in relation to the central opening 30. Furthermore, the centering ring 12 may include a rim centering portion 40 which projects beyond the front side of the track widening disc 10, which side is shown at the bottom in FIG. 2, and may be provided in order to be pushed into the central opening of a wheel. Consequently, the outer diameter of the circular-cylindrical rim centering portion 40 corresponds to the diameter of the central opening of the wheel provided for assembly or is only slightly smaller than the diameter of that central opening. The inner diameter of the retention portion 38, said inner diameter forming a hub centering portion 41, may correspond to the outer diameter of the rim centering portion 40. The rim centering portion 40 can be made slightly conical which is explained in detail in conjunction with FIG. 23.

The centering ring 12 may also have a hub centering portion 41 which is intended to be placed on the outer diameter of a wheel hub. By simply pushing the hub centering portion 41 onto the wheel hub, the centering ring 12 and the track widening disc 10 can then be centered on the wheel hub. According to some embodiments of the invention, different centering rings 12 may be provided with different inner diameters of the hub centering portion 41 in order to be used with different types of vehicles having different outer diameters of the wheel hub. The hub centering portion 41 can be made slightly conical which is explained in detail in conjunction with FIG. 23.

Figure 2:
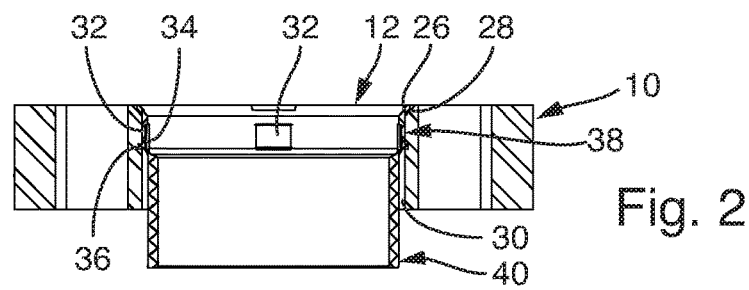
FIG. 2 is a cross-sectional view of the system of FIG. 1.

It can be seen in FIG. 1 and FIG. 2 that different centering rings 12 can be introduced into the track widening disc 10 in the track widening system according to the invention in order to be able to centre wheels having different diameters in respect of their central openings relative to the track widening disc 10. It can further be seen that the track widening disc 10 can be used for different pitch circles and different hole configurations of wheel hubs of vehicles. Consequently, the track widening system according to the invention makes it possible to manage with substantially fewer individual components and be able to cover a large number of different vehicles and different wheels.

Figure 3:
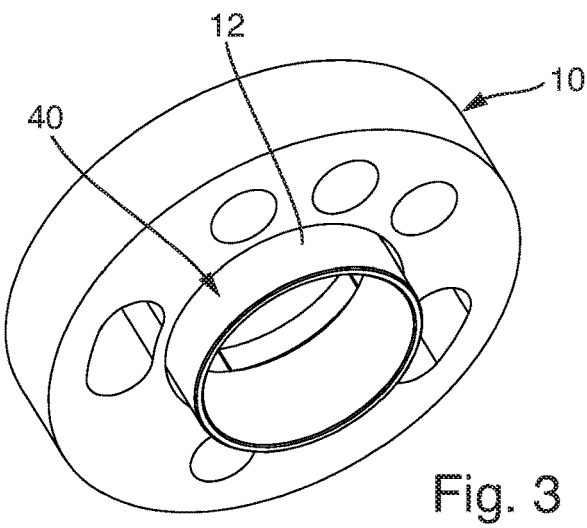
FIG. 3 is an oblique view of the system of FIG. 1.

The illustration of FIG. 3 is an oblique front view of the track widening disc 10 with the centering ring 12 inserted. As shown, the rim centering portion 40 of the centering ring 12 may project beyond the front side of the track widening disc 10 and can thereby be introduced into the central opening of a wheel.

Figure 4:
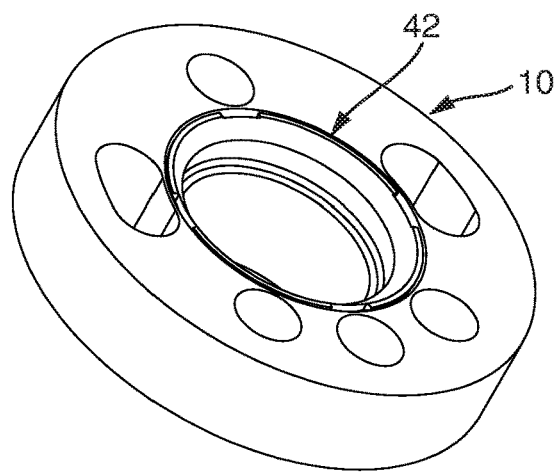
FIG. 4 is an oblique view of a track widening system including the track widening disc of FIG. 1 and a second centering ring in accordance with some embodiments of the present invention.
Figure 5:
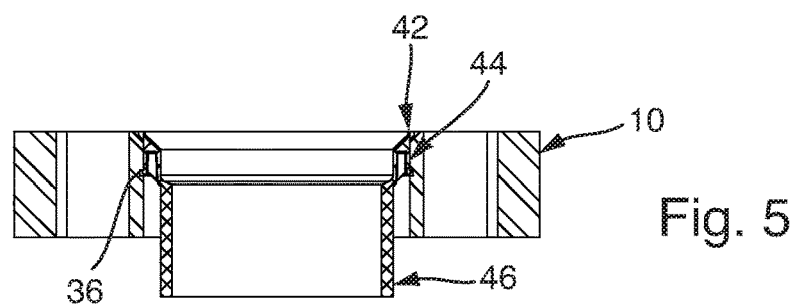
FIG. 5 is a cross-sectional view of the system of FIG. 4.
Figure 6:
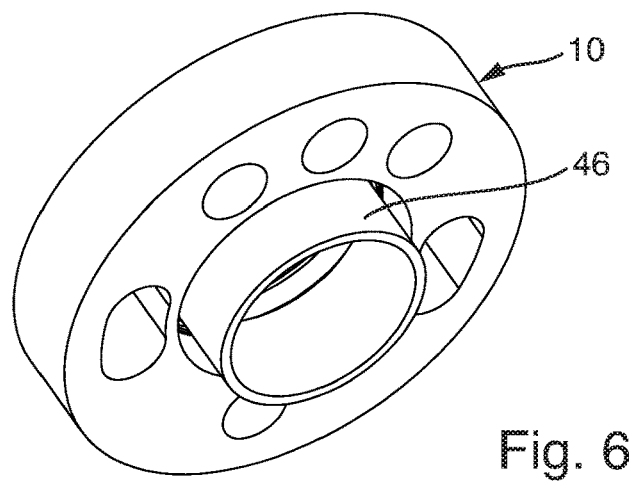
FIG. 6 is an oblique view of the system of FIG. 4.

The illustrations of FIGS. 4 to 6 show the track widening disc 10 which has already been illustrated in FIG. 1, with a different centering ring 42 having been introduced into the track widening disc 10. Centering ring 42 may have a retention portion 44 having the same outer diameter as the centering ring 12. Therefore, the centering ring 42 can also be introduced into the central opening 30 of the track widening disc 10 and, similarly to the centering ring 12, can be engaged in the groove 36 of the track widening disc 10 by means of catch proj e cti on s.

Unlike the centering ring 12, the centering ring 42 may have a centering portion 46 with an outer diameter which is smaller than the rim centering portion 40 of the centering ring 12. By the centering ring 42 being introduced into the track widening disc 10 in place of the centering ring 12, consequently, the track widening disc 10 can be adapted to wheels with a smaller diameter of the central opening 30.

Figure 7:
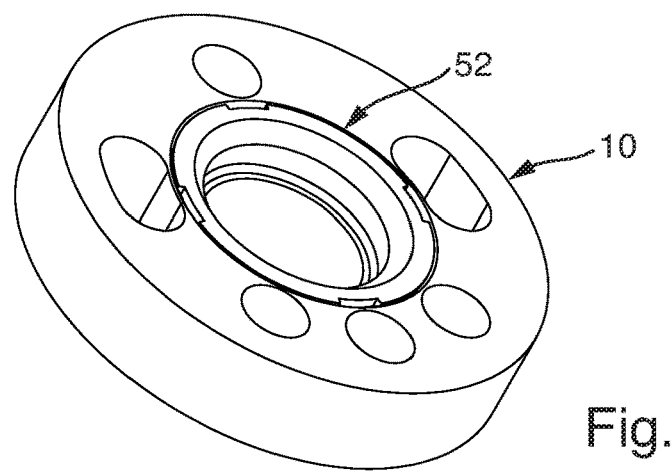
FIG. 7 is an oblique view of a track widening system including the track widening disc of FIG. 1 and a third centering ring in accordance with some embodiments of the present invention.
Figure 8:
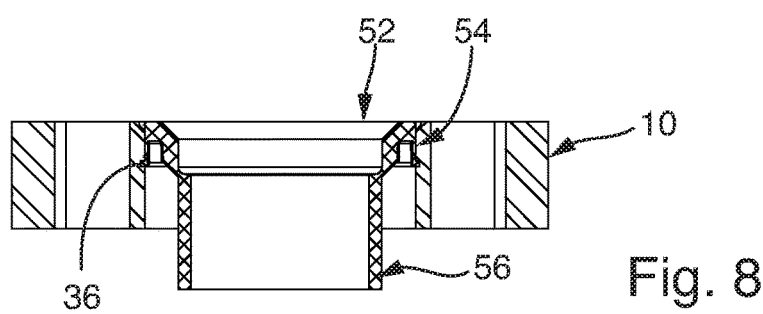
FIG. 8 is a cross-sectional view of the system of FIG. 7.
Figure 9:
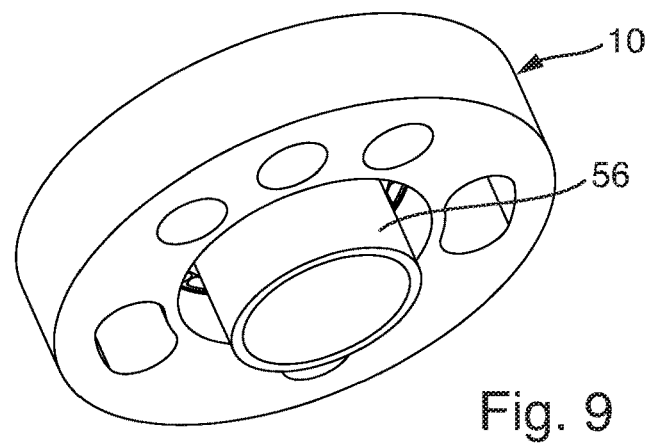
FIG. 9 is an oblique view of the system of FIG. 7.

The illustrations of FIGS. 7 to 9 show the track widening disc 10 of FIG. 1, with a different centering ring 52 having been introduced into the central opening 30 of the track widening disc 10 in place of the centering ring 12. The centering ring 52 may also have (and as illustrated more fully in the cross-sectional illustration of FIG. 8) a retention portion 54 which may have the same outer diameter as the retention portion 38 of the centering ring 12 (as shown in FIG. 2) and the retention portion 44 of the centering ring 42 (as shown in FIG. 5). The centering ring 52 can also be introduced into the central opening 30 of the track widening disc 10 and can be engaged in the groove 36 of the track widening disc 10 by means of the catch projections on the resilient arms.

Unlike the centering rings 12, 42, the centering ring 52 may have a centering portion 56 with an even smaller outer diameter. By the centering ring 52 being introduced, consequently, the track widening disc 10 can be used for wheels having an even smaller diameter of the central opening 30.

Figure 10:
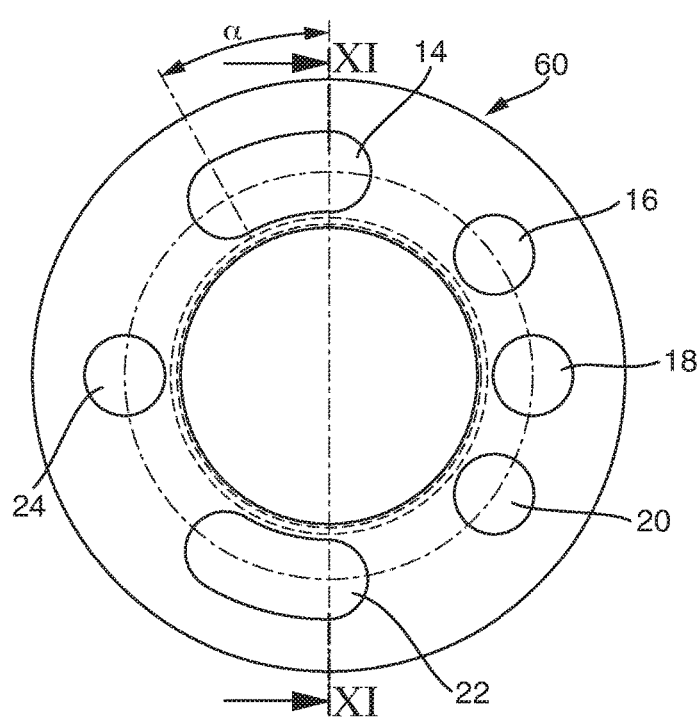
FIG. 10 is a plan view of a track widening disc of a track widening system in accordance with some embodiments of the present invention.

The illustration of FIG. 10 is a plan view of another track widening disc 60 according to the invention. The track widening disc 60 may have, similarly to the track widening disc 10 of FIG. 1, a total of six wheel bolt holes 14, 16, 18, 20, 22 and 24, however other numbers of wheel bolt holes are contemplated in accordance with some embodiments of the present invention. It can clearly be seen in FIG. 10 that track widening disc 60 may have two curved slots 14, 22 extending over an angular range a in order to be able to cover wheel hubs having different hole configurations.

Figure 11:
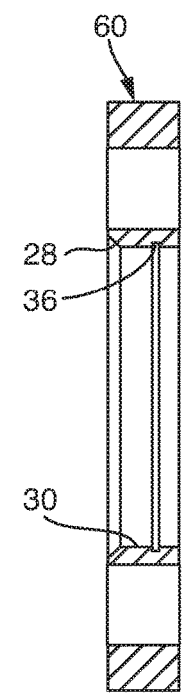
FIG. 11 is a cross-sectional view of FIG. 10 along section XI-XI.
Figure 22B:
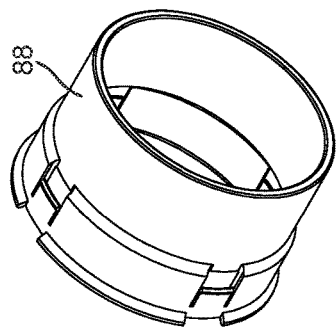
FIGS. 22A and 22B are oblique forward and reverse side views of a centering ring of a track widening system in accordance with some embodiments of the present invention.
Figure 22A:
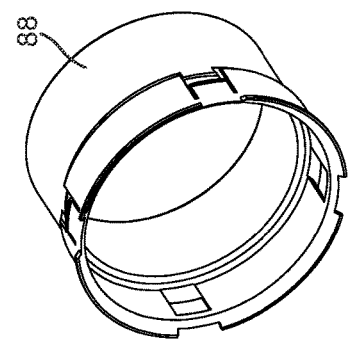
Figure 21B:
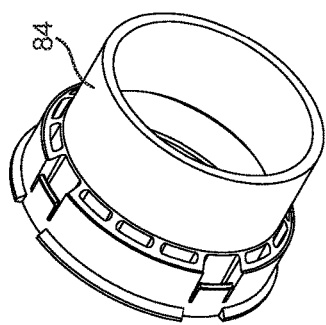
FIGS. 21A and 21B are oblique forward and reverse side views of a centering ring of a track widening system in accordance with some embodiments of the present invention.
Figure 21A:
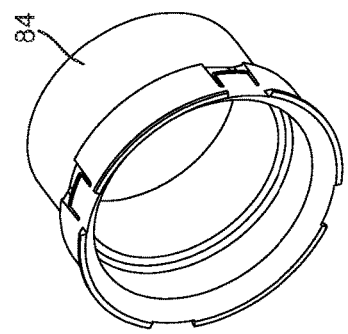
Figure 20B:
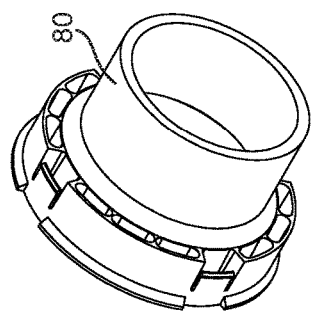
FIGS. 20A and 20B are oblique forward and reverse side views of a centering ring of a track widening system in accordance with some embodiments of the present invention.
Figure 20A:
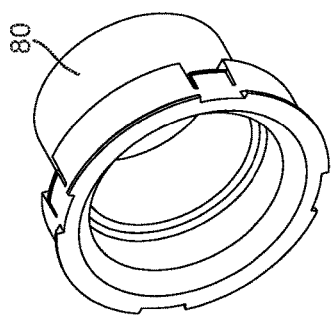

The illustration of FIG. 11 is a plan view of the plane of section XI-XI of FIG. 10. As illustrated, a groove 36, in the central opening 30 of the track widening disc 10, may be provided for the catch projections of the centering rings. Also illustrated is the chamfered portion 28 at the transition of the rear side of the track widening disc 60 into the central opening 30, which rear side is arranged on the left in FIG. 11. As discussed above, the chamfered portion 28 may serve to receive the collar 26 of the centering rings, which collar may also be chamfered, and thereby form a stop when the centering ring is introduced into the track widening disc 60.

The illustration of FIG. 12 is a side view of the centering ring 42 of FIG. 5. As above, the centering ring 42 may have a retention portion 44 whose outer diameter is adapted to the inner diameter of the central opening of the track widening discs and in which the resilient arms 32 are also arranged, at the free ends of which there may also be arranged catch projections 34 which extend radially outwards in relation to the centering ring 42. When viewed over the periphery of the centering ring 42, a total of four resilient arms 32 each having a catch projection 34 are arranged at the free end. However it is to be appreciated other numbers of resilient arms are contemplated in accordance with some embodiments of the invention. A frustoconical chamfered portion 43 may be provided at the transition between the retention portion 44 and the centering portion 46. That chamfered portion may vary with the difference in diameter between the retention portion 44 and the centering portion 46. A plurality of slot-like recesses 45 may be provided in the chamfered portion 43 over the periphery. Those recesses 45 may be used to keep the material thickness of the centering ring substantially constant in order to prevent deformation of the plastics material during manufacturing.

The illustration of FIG. 13 is a front view of the centering ring 42 (e.g., from the left in FIG. 12). FIG. 14 is a cross-section along the line A-A in FIG. 13. Consequently, the planes of section extend in FIG. 14 through a resilient arm 32 having a catch projection 34 and, at the bottom in FIG. 14, through one of the recesses 45. FIG. 14 further contains two enlarged detailed illustrations, in which the regions of FIG. 14 have been illustrated to an enlarged scale, which regions are circled in a dot-dash manner.

FIG. 15 is a rear view of the centering ring 42 of FIG. 12, that is to say, from the right in FIG. 12.

The illustrations of FIGS. 16A to 16J show by way of example a track widening system according to the invention having a total of four different track widening discs 70 (FIG. 16A), 72 (FIG. 16B), 74 (FIG. 16C) and 76 (FIG. 16D). It is to be appreciated that although four track widening discs are illustrated in the example of FIGS. 16A-D, track widening systems in accordance with some embodiments of the present invention may include other numbers of track widening discs. The track widening discs 70 and 72 are illustrated as differing in terms of the thickness thereof, as do the track widening discs 74 and 76. The track widening discs 70, 72 are illustrated as having a greater outer diameter than the track widening discs 74, 76. In some embodiments, a diameter of a central opening of the track widening discs 70, 72, 74, 76 is always constructed so as to be precisely the same so that different centering rings can be introduced into each of the track widening discs 70, 72, 74 and 76. As illustrated, in some embodiments six different centering rings 78 (FIG. 16E), 80 (FIG. 16F), 82 (FIG. 16G), 84 (FIG. 16H), 86 (FIG. 16I) and 88 (FIG. 16J) can be introduced into the track widening discs 70, 72, 74 and 76. However it is to be appreciated that track widening systems in accordance with some embodiments of the present invention may include other numbers of centering rings. With reference to FIGS. 16E to 16J, it can also be seen that the centering rings 78, 80, 82, 84, 86, 88 may differ in terms of the outer diameter of the centering portion thereof and may also differ in terms of the axial length of the retention portion thereof. However, the catch projections 34 with which the centering rings 78, 80, 82, 84, 86, 88 are engaged with the track widening discs 70, 72, 74, 76 are, in preferred embodiments, always arranged with the same spacing from the chamfered collar 26 of the centering rings 78, 80, 82, 84, 86, 88. This makes it possible for track widening discs 70, 72, 74, 76 and centering rings 78, 80, 82, 84, 86, 88 to be interchanged.

In some embodiments, the centering rings 78, 80 may have the same outer diameter of the centering portion and may have for identification a different but related colour (e.g. dark red and light red). The centering rings 82, 84 may have a larger diameter of the centering portion when compared to the centering rings 78, 80; both centering rings 82, 84, however, in accordance with some embodiments of the invention, may have the same outer diameter of the centering portion. The centering rings 78, 80 may have for identification a different but related colour (e.g., yellow and orange) which is different than the colouring of the centering rings 78, 80. The centering rings 86, 88 are illustrated as having the biggest diameter of the centering portion of all centering rings and, for identification, may have a different but related colour (e.g. a bright white and a darker white) which is different than the colouring of the other centering rings. It is to be appreciated that, in preferred embodiments, all centering rings of different dimensions (e.g., centering rings 78, 80, 82, 84, 86, 88) may have a different colour. It is further to be appreciated that in accordance with some embodiments of the invention other identifying features may distinguish the different centering rings. For example, and without limitation, the centering rings may have text or symbolic markings thereon for distinguishing purposes. In preferred embodiments, centering rings having the same outer diameter of the centering portion may have a related colour. Such a colour identification system according to the invention is independent of the provision of catch devices. As a consequence, such a colour identification system is independent of the provision of the catch projections 34 on the resilient arms 32 and can be realized with centering rings without catch devices.

The illustrations of FIGS. 17A-B, 18A-B, 19A-B, 20A-B, 21A-B, and 22A-B show in each case two views of the centering rings 78, 80, 82, 84, 86, 88, respectively, an oblique front view and an oblique rear view.

Figure 23:
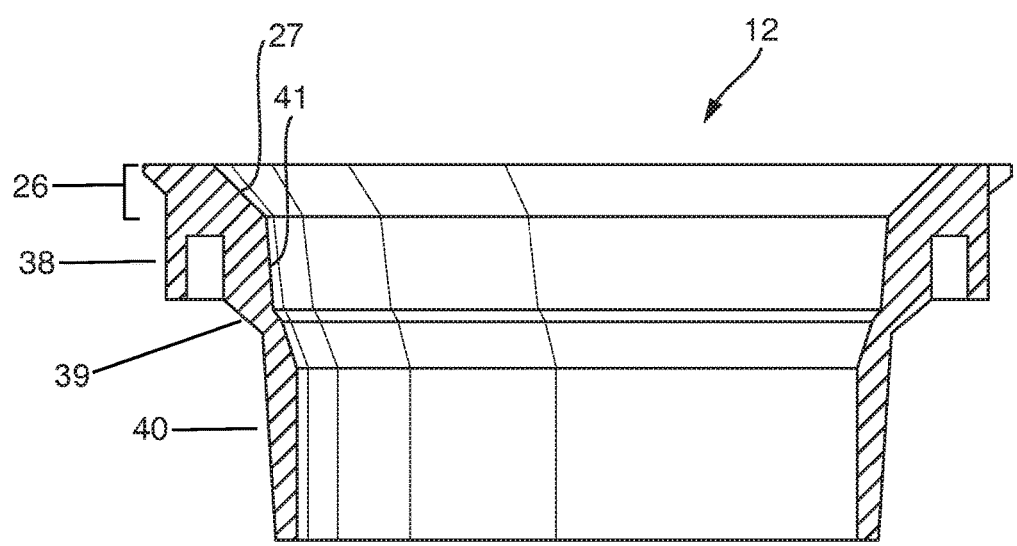
FIG. 23 is a cross-sectional view of a centering ring of a track widening system in accordance with some embodiments of the present invention.

FIG. 23 shows a schematical cross-section of a centering ring 12 according to the invention. FIG. 23 is not drawn to scale, rather, the conicity of the hub centering portion 41 and the rim centering portion 40 is exaggerated to show these features. Apart from the special shape of the rim centering portion 40 and the hub centering portion 41, the centering ring 12 may comprise the same features as the centering rings already described.

As above with reference to FIGS. 1 and 2, the retention portion 38 of the centering ring 12 may be fixed to a track widening disc 10 (not illustrated in FIG. 23). Together with the centering ring 12, the track widening disc 10 may be pushed onto the wheel hub of a car. The inner diameter of the retention portion 38 may be formed by the hub centering portion 41. The inside portion 27 of the chamfered collar 26 may help to center the centering ring 12 on the wheel hub. Similar to some other embodiments of the present invention as described above, centering ring 12 may include a frustoconical chamfered portion 39 at the transition between retention portion 38 and rim centering portion 40. An inner surface of frustoconical chamfered portion 39 may have one or more transition points at which the inner diameter narrows between hub centering portion 41 and a point on an inner surface of rim centering portion 40. The hub centering portion 41 can be slightly conical, as illustrated in FIG. 23. Again, FIG. 23 is not drawn to scale, and the conicity of hub centering portion 41 is strongly exaggerated to illustrate some embodiments of the invention. The centering ring 12 may be pushed onto the circular cylindrical outer diameter of the wheel hub. The hub centering portion 41 may have a wider diameter adjacent the chamfered collar 26 and a narrower diameter in a direction away from the chamfered collar 26. When pushing the centering ring 12 onto the wheel hub, the centering ring 12 may, therefore, be centered onto the wheel hub. In such implementations of the invention, tolerances of the outer diameter of the wheel hub can be compensated. By making the hub centering portion 41 slightly conical, the centering ring 12 can be placed onto the wheel hub free from play. In addition, since the centering ring 12 may comprise plastic, the slight conicity of the hub centering portion 41 makes it easier to get the centering ring 12 out of a form during manufacturing. In some examples, and without limitation, the diameter of the hub centering portion 41 narrows by a few tenths of a millimeter (e.g., if the diameter of the hub centering portion 41 amounts to 58.3 mm at its upper end in FIG. 23 adjacent to the chamfered collar 26, it may then narrow down to 58 mm at its lower end). It is to be appreciated that other dimensions are contemplated in accordance with some embodiments of the invention.

It can also be seen in FIG. 23 that an outer surface of rim centering portion 40 may also be slightly conical and narrow its diameter from top down in FIG. 23. The conicity of an outer surface of rim centering portion 40 is also strongly exaggerated in FIG. 23 to illustrate some embodiments of the invention. The largest diameter of the rim centering portion 40 may be, therefore, placed adjacent to the retention portion 38 and the smallest diameter of the rim centering portion 40 may be placed at the end of the centering ring 12 opposite the retention portion 38. When a wheel is placed onto the centering ring 12, tolerances of the inner diameter of the central opening of a wheel can therefore be compensated. By making an outer surface of rim centering portion 40 slightly conical, the centering ring 12 can, therefore, be arranged without play in the central opening of a wheel. In addition, making an outer surface of rim centering portion 40 slightly conical makes it easier to get the plastic centering ring 12 out of its form during manufacturing. In some examples, and without limitation, the diameter of an outer surface of rim centering portion 40 narrows for only a few tenths of a millimeter (e.g., if the diameter of the rim centering portion 40 amounts to 58 mm at its upper end in FIG. 23, adjacent the retention portion 38, it will narrow down to 57.5 mm at its lower end). It is to be appreciated that other dimensions are contemplated in accordance with some embodiments of the invention.

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is to be understood that variations and modifications of the present invention may be made without departing from the scope thereof. It is to be appreciated that the features disclosed herein may be used different combinations and permutations with each other, all falling within the scope of the present invention. It is also to be understood that the present invention is not to be limited by the specific embodiments disclosed herein, but only in accordance with the appended claims when read in light of the foregoing specification.

What is claimed is:

1. A track widening system for motor vehicles, comprising:
    a) a track widening disc having a central opening; and
    b) a centering ring comprising plastic, said centering ring for insertion into an opening of a wheel and for insertion into said central opening of said track widening disc,
        wherein said centering ring comprises a collar at a rear side, a retention portion adjacent to said collar, a frustoconical chamfered portion adjacent to said retention portion, and a rim centering portion at a front side,
        wherein an inner surface of said retention portion of said centering ring comprises a hub centering portion,
        wherein an outer surface of said rim centering portion of said centering ring is conical and projects beyond a front side of said track widening disc,
        wherein said centering ring has a first catch device positioned at an end of a resilient arm and wherein said track widening disc has a corresponding second catch device, and
        wherein said first catch device comprises a catch projection which projects outwards in a radial direction, and wherein said second catch device extends around said central opening of said track widening disc.

2. The track widening system of claim 1, said track widening disc further comprising a chamfered portion which extends around said central opening.

3. The track widening system of claim 2, wherein said chamfered portion is arranged at a transition between said central opening and a rear side of said track widening disc.

4. The track widening system of claim 1, said track widening disc further comprising a groove which extends around said central opening.

5. The track widening system of claim 1, said track widening disc further comprising a plurality of wheel bolt holes for receiving wheel bolts.

6. The track widening system of claim 5, wherein a dimension of each of said wheel bolt holes in a radial direction of the track widening disc is from 1.2 times to 1.7 times the diameter of said wheel bolts.

7. The track widening system of claim 6, wherein a dimension of each of said wheel bolt holes in a radial direction of the track widening disc is 1.5 times the diameter of said wheel bolts.

8. The track widening system of claim 5, wherein at least one of said wheel bolt holes comprises a curved slot which extends in a peripheral direction.

9. The track widening system of claim 1, further comprising a plurality of centering rings, each said centering ring further comprising a retention portion and a centering portion.

10. The track widening system of claim 9, wherein an outer diameter in said retention portion of each of said centering rings is the same.

11. The track widening system of claim 10, wherein said outer diameter of said centering portion of at least two of said centering rings is different.

12. The track widening system of claim 11, wherein said outer diameter of said centering portion of each of said centering rings is different.

13. The track widening system of claim 11, wherein at least two of said centering rings have a different colour.

14. The track widening system of claim 1, further comprising a plurality of track widening discs.

15. The track widening system of claim 14, wherein a thickness of at least two of said track widening discs is different.

16. The track widening system of claim 14, each said plurality of track widening discs comprising a plurality of wheel bolt holes for receiving wheel bolts, wherein the arrangement of said wheel bolt holes of at least two said track widening discs are different.

17. The track widening system of claim 1, wherein said centering ring comprises injection molded plastic.

18. The track widening system of claim 1, wherein the centering ring comprises fiber-reinforced plastic.

19. A track widening system for motor vehicles, comprising:
   a) at least two track widening discs, each said track widening disc having a central opening; and
   b) a plurality of centering rings, each said centering ring comprising plastic, and each said centering ring for insertion into said central opening of each said track widening disc,
       wherein each of said centering rings comprises a collar at a rear side, a retention portion adjacent to said collar, a frustoconical chamfered portion adjacent to said retention portion, and a rim centering portion at a front side,
       wherein an inner surface of said retention portion of each of said centering rings comprises a hub centering portion,
       wherein an outer surface of said rim centering portion of each of said centering rings is conical and projects beyond a front side of said track widening disc, said rim centering portion for insertion into an opening of a wheel,
       wherein said retention portion of each of said centering rings is for engaging a portion of said track widening disc,
       wherein an outer diameter of said retention portion of each of said plurality of centering rings is the same, and wherein an outer diameter of said rim centering portion of at least two of said centering rings is different, and
       wherein a thickness of at least two of said track widening discs is different, and wherein each of said centering rings can be arranged in said central opening of each of said track widening discs.

20. The track widening system of claim 19, wherein at least two of said plurality of centering rings have a different colour.

21. The track widening system of claim 19, wherein each of said plurality of centering rings comprise injection molded plastic.

22. The track widening system of claim 19, wherein each of said plurality of centering rings comprise fiber-reinforced plastic.

23. A track widening system for motor vehicles, comprising:
   a) a track widening disc having a rear side, a front side, and a central opening, said rear side having a chamfered portion extending around said central opening and a groove extending around said central opening, said track widening disc further comprising a plurality of wheel bolt holes for receiving wheel bolts, wherein a dimension of each of said wheel bolt holes in a radial direction is from 1.2 times to 1.7 times the diameter of said wheel bolts and wherein at least one of said wheel bolt holes comprise a curved slot which extends in the peripheral direction; and
   b) a first and a second centering ring, each of said centering rings having a rim centering portion at a front side for insertion into said central opening of said track widening disc and which projects beyond said front side of said track widening disc, a chamfered collar at a rear side for engaging said chamfered portion of said track widening disc, an inner surface of a retention portion between said chamfered collar and said rim centering portion comprising a hub centering portion, and at least one catch projection positioned an end of a resilient arm for engaging said groove of said track widening disc,
   wherein an outer surface of said rim centering portion is conical,
   wherein each of said centering rings comprise fiber-reinforced plastic material, a different colour,
   wherein an outer diameter of said retention portion of each of said centering rings is the same, and
   wherein an outer diameter of said rim centering portion of each of said centering rings is different.

24. A track widening system for motor vehicles comprising:
   a) a plurality of track widening discs, each said track widening disc having a central opening, wherein internal diameters of said central opening of each of said track widening discs are the same; and
   b) a plurality of plastic centering rings adapted to be inserted into said central opening of each of said track widening discs, wherein a front side of each of said centering rings has a rim centering portion comprising a conical outer surface, wherein a rear side of each of said centering rings comprises a collar, and wherein each said centering rings further comprise (i) a retention portion adjacent to said collar and having an inner surface comprising a hub centering portion and (ii) a frustoconical chamfered portion between said retention portion and said rim centering portion,
       wherein outer diameters of said retention portion of each of said centering rings are the same,
       wherein each of said centering rings comprise a first catch device and wherein each of said track widening discs have a second catch device.

25. The track widening system of claim 24, wherein said first catch device comprises a catch projection at distal an end of a resilient arm of said retention portion.

26. The track widening system of claim 25, said catch projection projecting radially outward from a center of said centering ring.

27. The track widening system of claim 25, wherein said second catch device comprises a groove in said central opening of said track widening disc.

28. The track widening system of claim 24, wherein outer diameters of said rim centering portion of at least two of said centering rings are different.

29. The track widening system of claim 28, wherein inner diameters of said hub centering portion of at least two of said centering rings are different.

30. The track widening system of claim 3, wherein said collar of said centering ring is chamfered on a peripheral edge.

31. The track widening system of claim 1, wherein said second catch device comprises a shoulder.

32. The track widening system of claim 1, said hub centering portion having a conical surface.

33. The track widening system of claim 19, said hub centering portion having a conical surface.

34. The track widening system of claim 23, said hub centering portion having a conical surface.

35. The track widening system of claim 24, said hub centering portion having a conical surface.

\* \* \* \* \*